US008942461B2

(12) United States Patent
Lundblad et al.

(10) Patent No.: US 8,942,461 B2
(45) Date of Patent: Jan. 27, 2015

(54) METHOD FOR A BANKNOTE DETECTOR DEVICE, AND A BANKNOTE DETECTOR DEVICE

(75) Inventors: Leif J. I. Lundblad, Stockholm (SE); Lennart Vedin, Skogas (SE); Claes Bjorkman, Stockholm (SE)

(73) Assignee: Banqit AB, Kista (SE)

( * ) Notice: Subject to any disclaimer, the term of this patent is extended or adjusted under 35 U.S.C. 154(b) by 395 days.

(21) Appl. No.: 13/266,535

(22) PCT Filed: Apr. 20, 2010

(86) PCT No.: PCT/EP2010/055142
§ 371 (c)(1), (2), (4) Date: Oct. 27, 2011

(87) PCT Pub. No.: WO2010/124963
PCT Pub. Date: Nov. 4, 2010

(65) Prior Publication Data
US 2012/0045112 A1 Feb. 23, 2012

(30) Foreign Application Priority Data
Apr. 28, 2009 (EP) .................................... 09158890

(51) Int. Cl.
*G06K 9/00* (2006.01)
*G06K 9/34* (2006.01)
(Continued)

(52) U.S. Cl.
CPC ................ *G07D 7/168* (2013.01); *G07D 7/162* (2013.01); *G07D 7/2058* (2013.01)
USPC ............ 382/135; 382/154; 382/173; 382/181

(58) Field of Classification Search
None
See application file for complete search history.

(56) References Cited

U.S. PATENT DOCUMENTS 4,823,393 A 4/1989 Kawakami
5,623,528 A * 4/1997 Takeda ............................. 378/2
(Continued)

FOREIGN PATENT DOCUMENTS

EP 0 382 549 8/1990
EP 1 160 737 12/2001
(Continued)

OTHER PUBLICATIONS

International Search Report dated Jun. 23, 2010, corresponding to PCT/EP2010/055142.
(Continued)

*Primary Examiner* — Matthew Bella
*Assistant Examiner* — Weiwen Yang
(74) *Attorney, Agent, or Firm* — Young & Thompson

(57) ABSTRACT

A banknote detector device for an automatic teller machine, for differentiating between non-accepted and accepted banknotes, includes a banknote image sensor to receive and scan at least one face of an input banknote and to store a banknote image (BI) of each scanned. The image includes image data in the form of a number of pixels; and a reference banknote image (RBI) storage where one reference banknote image, being processed from a predetermined number of banknote images from accepted banknotes, is stored for each face of each banknote. The device includes an alignment, a banknote face classification unit, a printed pattern positioning unit and a comparison unit where, for at least one face of the banknote, the BI and RBI, being in exact pattern position in relation to each other, are compared pixel per pixel according to a predefined comparison procedure to classify the banknote as accepted or non-accepted.

12 Claims, 9 Drawing Sheets

(51) Int. Cl.
*G07D 7/16* (2006.01)
*G07D 7/20* (2006.01)

(56) References Cited

U.S. PATENT DOCUMENTS

| | | | | |
|---|---|---|---|---|
| 5,692,068 | A | 11/1997 | Bryenton et al. | |
| 5,731,880 | A * | 3/1998 | Takaragi et al. | 358/296 |
| 6,179,110 | B1 * | 1/2001 | Ohkawa et al. | 194/203 |
| 6,205,259 | B1 * | 3/2001 | Komiya et al. | 382/284 |
| 6,289,125 | B1 * | 9/2001 | Katoh et al. | 382/194 |
| 7,006,686 | B2 * | 2/2006 | Hunter et al. | 382/162 |
| 7,502,515 | B2 * | 3/2009 | Gu et al. | 382/236 |
| 7,589,339 | B2 * | 9/2009 | Mukai | 250/559.11 |
| 8,494,249 | B2 | 7/2013 | Yonezawa et al. | |
| 8,503,796 | B2 | 8/2013 | He et al. | |
| 2006/0108732 | A1 * | 5/2006 | Kanno et al. | 271/4.03 |
| 2008/0159614 | A1 * | 7/2008 | He et al. | 382/135 |

FOREIGN PATENT DOCUMENTS

| | | | | |
|---|---|---|---|---|
| GB | 2 199 173 | | 6/1988 | |
| JP | H0836662 | | 2/1996 | |
| JP | 2005038389 | | 2/2005 | |
| JP | 2008181507 | | 8/2008 | |
| WO | 95/24691 | | 9/1995 | |
| WO | WO 2007107418 | A1 * | 9/2007 | G07D 7/00 |
| WO | 2009/031242 | | 12/2009 | |

OTHER PUBLICATIONS

Japanese Office Action dated Jan. 23, 2014 in corresponding JP application.

* cited by examiner

METHOD FOR A BANKNOTE DETECTOR DEVICE, AND A BANKNOTE DETECTOR DEVICE

FIELD OF THE INVENTION

The present invention relates to a method and a device according to the preambles of the independent claims.

The present invention is pertinent as to arts and devices for checking and determining authenticity, value and unfitness (decay) degree of banknotes, and in particular to banknote handling machines, or automatic teller machines (ATMs), to search for and to find counterfeit banknote or banknotes being ink dyed as a result of non-authorized opening of a cassette provided with an ink dyeing ampoule.

BACKGROUND OF THE INVENTION

In spite of numerous predictions of a cashless society, the amount of cash in circulation has not declined. There are today an estimated 360 billion transactions in the EU every year to be compared with 60 billion non-cash transactions. The handling of cash is a very cost consuming operation still involving a lot of manual handling and transportation to and from consumers, retailers, banks, cash centres and National banks. The cash is counted on numerous occasions during this circulation and the security problems are extensive. The annual cost for handling of cash in the European Union is around 50 billion Euro.

Conventional banknote sorting and counting devices are designed for automatic processing of banknotes of any issue, value and country. The process on which the operation of the device is based consists of determining authenticity, denomination and decay level of a banknote using full images—obtained with scanning devices—of both banknote sides inter alia in the visible spectral range and in the infrared spectral range. The images are transmitted to and processed in a computing unit where obtained images are compared to reference images with the help of preinstalled pattern recognition software.

A number of different measures have been taken in order to secure banknotes against counterfeits, e.g. by printing pictures on banknotes with so-called metameric inks; these pictures cannot be seen with a naked eye and only reveal themselves in the infrared spectrum. Knowing a concrete infrared image, it is possible to develop a detector that checks several certain points on the banknote surface for availability or absence of metameric ink.

EP-1160737 relates to a method for determining the authenticity, the value and the decay level of banknotes, and a sorting and counting device.

WO-95/24691 relates to a method and apparatus for discriminating and counting documents that inter alia comprises a memory that stores master characteristic patterns corresponding to associated predetermined surfaces of a plurality of denomination s of genuine bills.

GB-2199173 relates to a bill discriminating device adapted to carry out an operation by extracting data from only a characteristic region of a bill.

The inventors to the present invention have identified a need of improved detection capabilities regarding banknotes being ink dyed as a result of robbery.

SUMMARY OF THE INVENTION

The above-mentioned object is achieved by the present invention according to the independent claims.

Preferred embodiments are set forth in the dependent claims.

Thus, according to the present invention a method and a device are arranged in order to improve the capabilities of detecting ink-dyed banknotes.

In Short the Method Comprises:

A) an alignment step where one side of the banknote image is aligned, by use of a stored IR-image of the input banknote, in relation to the respective side of a reference banknote image (RBI), and that the banknote size is determined, B) a banknote face classification step is performed to determine face and orientation of the banknote image, C) a printed pattern positioning step where the printed pattern of the banknote image (BI) is determined in order to exactly position the BI printed pattern in relation to the printed pattern of a reference banknote image (RBI), D) a comparison step where, for at least one face of the banknote, the BI and RBI, being in exact pattern position in relation to each other, are compared pixel per pixel according to a predefined comparison procedure resulting in that the input banknote is classified as accepted or non-accepted.

The present invention will now be described in detail with references to the appended drawings

SHORT DESCRIPTION OF THE APPENDED DRAWINGS

DETAILED DESCRIPTION OF PREFERRED EMBODIMENTS OF THE INVENTION

The banknote detector device according to the present invention may be arranged as a separate module of a standard ATM, or may be implemented as an integral part, using the available image detectors, of a standard ATM. As indicated above the banknote detector according to the present invention is suited, in particular, to detect, identity and sort-out ink-dyed banknotes. The banknote detector device may be used in conjunction with other detector devices that are specifically dedicated for detection of false banknotes. It should be noted that the detector device according to the present invention, if being properly set-up, also may be used in that regard.

Figure 1:
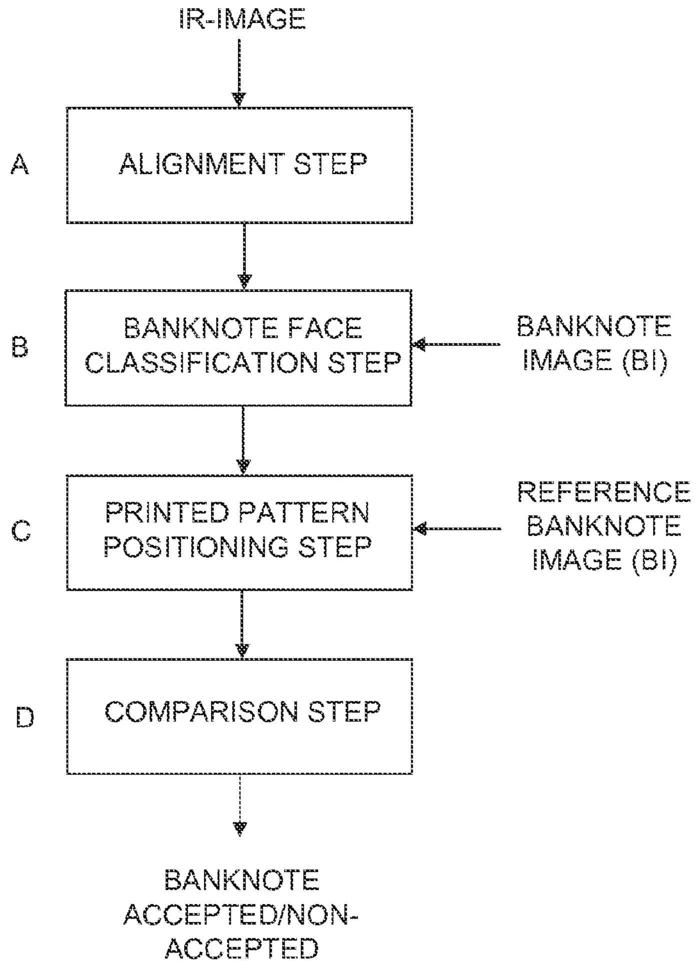
FIG. 1 is a flow diagram illustrating the present invention.
Figure 2:
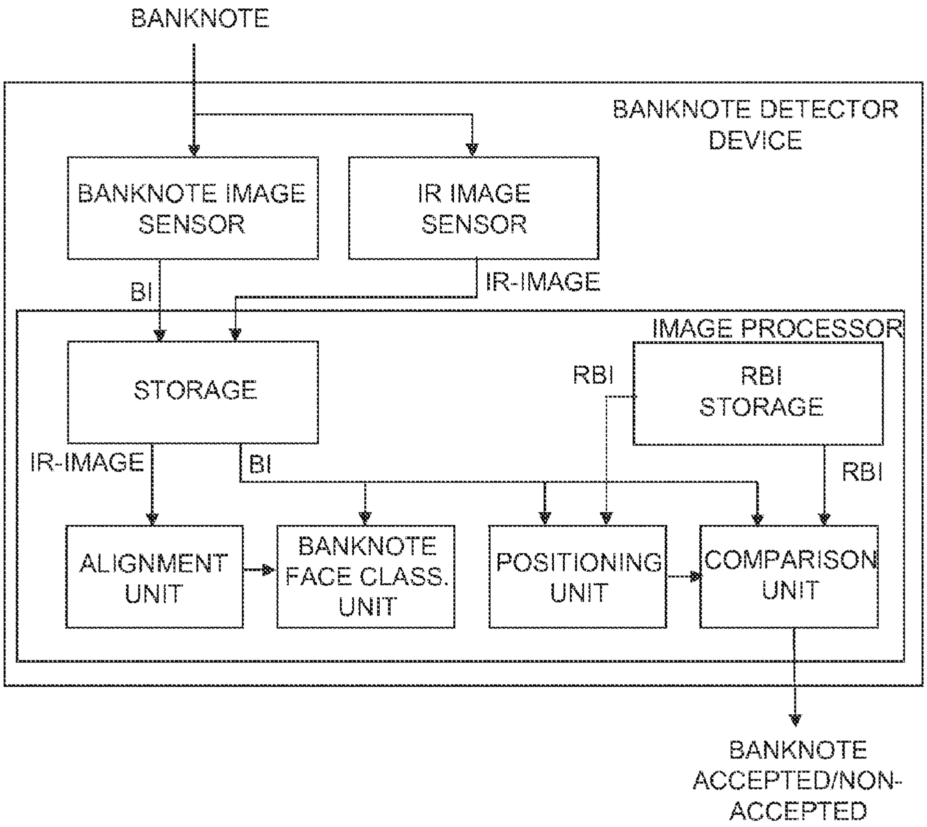
FIG. 2 is a block diagram illustrating an embodiment of the present invention.
Figure 3:
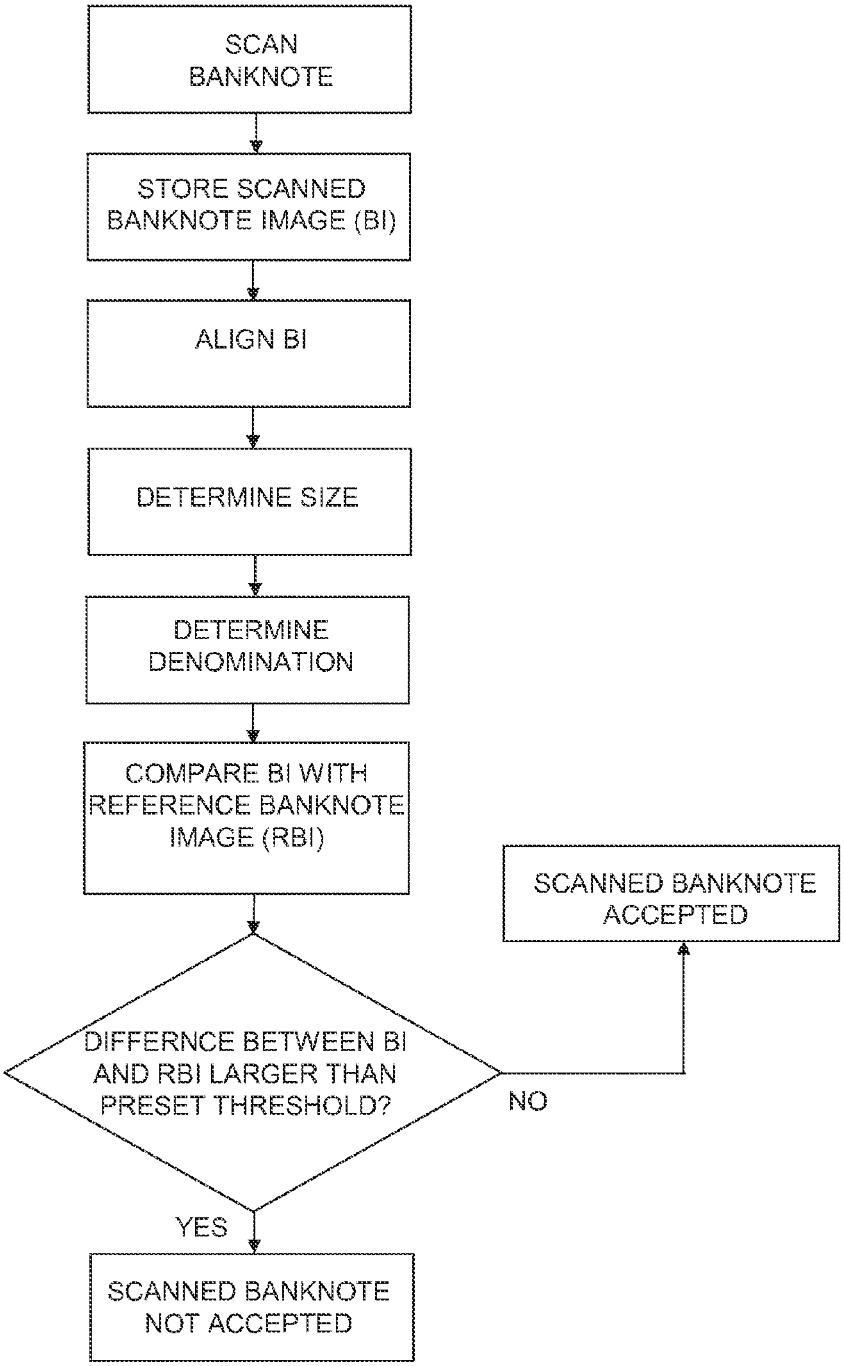
FIG. 3 is another flow diagram illustrating the present invention.

With references to FIG. 2 the detection is performed by a banknote image sensor, that preferably comprises two physical detector-units, one detector for each side of the banknote. If any of the detectors detect a dyed face, the note is considered as dyed. The banknote handling device comprises the banknote image sensor, preferably an infrared (IR) image sensor and an image processor. The image processor includes, in its turn, a storage, a reference banknote image (RBI) storage, an alignment unit, a banknote face classification unit, a positioning unit, and a comparison unit. The IR-image of the banknote is stored in the storage such that the IR-image being linked to the corresponding banknote image. As will be discussed below the IR image sensor may be obviated. Also the banknote alignment and banknote classification may be performed by other means, but these units are nevertheless included in FIG. 2 as the results of the corresponding method steps are necessary requirements for the steps C and D, as will become clear from the following description.

The image processor receives, from the detectors, image signals representing the detected images, and the image processor then processes the image signals.

A banknote image comprises one infrared (IR)-layer and layers for each RBG (Red, Blue, Green) colour, i.e. totals 4 layers. The IR-layer resolution is preferably 864×300 pixels, while each RGB layers are squared symmetric pixels with a resolution of 432×300 pixels. However, the IR-layer is addressed and effectively used only by squared symmetric 432×300 pixels in order to simplify the algorithm. Each symmetric pixel represents 0.5×0.5 mm. All pixels have a value 0-255 where 0 is the darkest. When processing the banknote image according to the algorithm the colour image layers are read and counted as inverted CMY (Cyan, Magenta, Yellow) where 255 is the darkest. CMY is used to define logical values of the amount of colour-print on white paper. It should be noted that the present invention is equally applicable if RBG is used instead for processing purposes.

The RGB-image of the banknote is preferably obtained by a Colour Contact Image Sensor, a CIS-sensor.

According to one embodiment the banknote is at a distance of max 1 mm from the CIS-sensor in order to be able to pull the banknote pass the sensors.

In another embodiment the banknote is mechanically moved passed the CIS-sensor and pressed towards the sensor. More accurate measurements are then obtained and e.g. the IR-sensor may be obviated.

Figure 4:
FIG. 4 shows a raw image of a robbery ink coloured banknote, before any processing is made on the image.

The illustration in FIG. 4 shows a raw image of the front side of a robbery ink coloured banknote, before any processing is made on the image. In this case a Swedish 100 crown banknote.

The method according to the present invention, comprising steps A, B, C and D, will now be described with references to the FIGS. 1, 3 and 4-15.

A—Alignment Step

Figure 5:
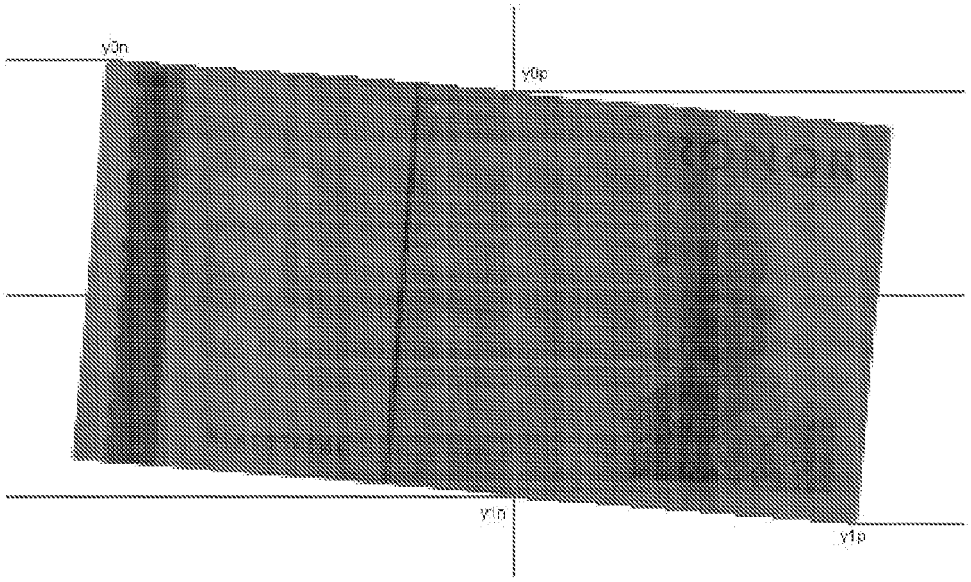
FIG. 5 is an IR-image of the banknote prior the skewing procedure.

The purpose of this step is to align the scanned banknote in order to determine the size of the banknote. This is preferably performed by a so-called "squeezing method" which is schematically illustrated in FIG. 5 that shows an IR-image of a non-aligned banknote. In the aligning step the IR banknote image, being a dark rectangle, preferably is used. According to an alternative embodiment the alignment instead is performed using the banknote image obtained by the banknote image sensor.

The angle between the dark rectangle, the banknote image, and a horizontal line is determined, and the banknote image is then iteratively rotated until the banknote image is in a horizontal position, i.e. the longer side is horizontal. It should be noted that any side of the banknote could be used in when performing the alignment. The orientation of this side is then compared to the orientation of the respective side of the reference banknote image. During the iteration the first rotation of the banknote image is rather big, the next rotation is e.g. half the first rotation, etc.

It should be noted that the aligning step is preformed on all detected banknotes.

This step of the procedure is to orientate, or align, the banknote image in a predefined position, e.g. horizontally, which is a presumption when performing the subsequent steps.

According to this step, the angle of a rectangular or approximated rectangular banknote image document is determined by identifying the skew-angle where the document vertical height is minimum.

Thus, for this purpose the IR-image is used. The quality of the IR-image must be such that it does not indicate any dark pixels outside the document. A threshold is used to indicate dark pixels. During the alignment step different skew-angles are tried out and the height is measured until the angle resulting in the minimum height is found.

For practical reasons related to the used programming technique the image-data is never moved when the angle-skew is performed, but instead the read-process does perform an angle-skew x-y-coordinate recounting according to a preset angle. Referring to FIG. 5, showing an IR-image of the banknote prior the skewing procedure, the height is measured in this clockwise skew as y1p-y0n. An approximated correction angle is calculated by use of all four points y0n, y0p, y1n, y1p. After correction of the angle the process is repeated using the new correction.

When the difference ((y1p-y0n)−(y1n-y0p)) are small, called "level-I" (i.e. the angle is small) the correction is only ½ of the approximated calculated value. When even smaller difference, called "level-II", the correction is only ¼ of approximated calculated value. This is to ensure that the best fit angle is not missed. The last level-II is repeated until no more changes in height can be determined.

When the skew instead is counter clockwise, the same, but mirrored, calculation is performed.

When the angle determination is ready, the corners position in the image are determined as the smallest rectangle where all the document's IR-pixels can be inbound. This is illustrated in FIG. 6 that shows the IR-image of the banknote inbound in a rectangle determined by the skewing procedure.

The corner positions are stored in the storage arranged in connection with the image processor together with the skew-angle.

Figure 6:
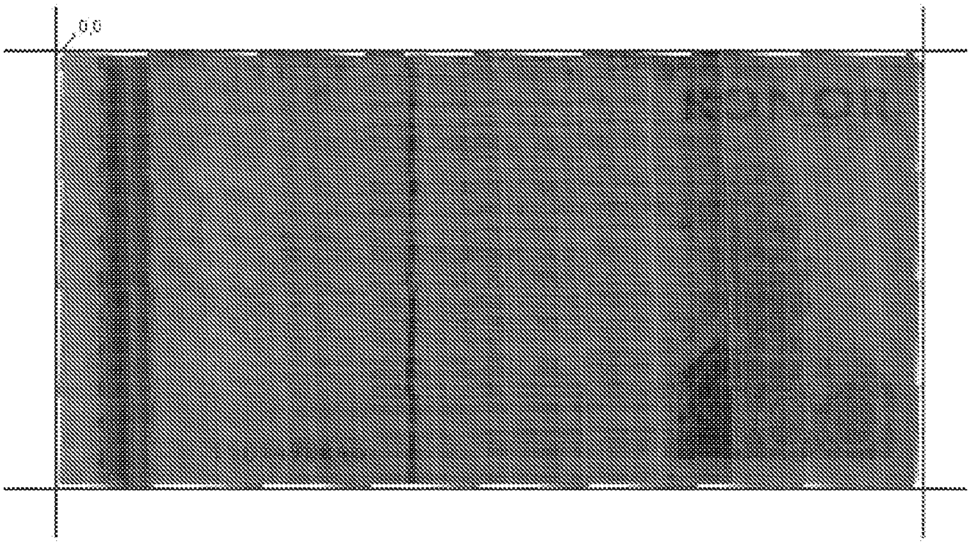
FIG. 6 shows an IR-image of the banknote inbound in a rectangle determined in the skewing procedure.

After this process the document's pixels are read as in FIG. 6 by processing the skew-angle and document position left-top as x-y-coordinate 0,0.

According to an alternative embodiment the position and the size of BI is determined by instead identifying the position of the banknote corners and the angle to a horizontal line and by trigonometrical calculations determine the size and position. This may be performed on either the BI or the IR-image.

B—Banknote Face Classification Step.

A presumption for this step is that the size of the banknote image has been determined (in aligning step A), and a purpose of this step is to identify the scanned banknote and to identify orientation and side. Below is one embodiment discussed in detail but many other alternatives exist, as this information may already be available from other sensors of the system, i.e. from other sensors arranged to verify the authenticity to the input banknote. However, this step must be performed prior the remaining steps C and D.

Based upon the size, stored denomination data related to this size is identified. For example: one specific size has four different denomination data stored; front side (correctly oriented and up and down) and back side (correctly oriented and up and down). In some cases even a higher number of different denomination data might be stored. E.g. if different versions of a banknote have been issued.

For each stored denomination data certain fields are identified, being carefully chosen to represent a unique set of identification parts of the banknote. These fields may be part of the banknote that should be white (or light coloured). The number of fields chosen depends upon the outlook of the banknote, e.g. a very coloured banknote requires more fields. Also the geometric shape of a specific field is chosen in relation to the outlook of the banknote and could be rectangular, circular or any suitable shape.

In the case where four denomination data are used the respective data field are all compared to the detected banknote image and the denomination of the detected banknote is then identified being the banknote where the fields corresponds to the fields of one of the stored denomination data. As a result the denomination and which side and orientation of the banknote that the detected banknote image relates to is identified.

More in detail, this step is performed by using a predetermined number of sample regions that together are unique for a banknote of a determined size. The classification is performed by a banknote face classification unit by calculating at least one value related to the pixel values of each sample region of the aligned banknote image and comparing the at least one pixel values to specified values representing a specific banknote face to determine face and orientation of the banknote image.

In this step it is determined which face (side) of the banknote the image represents, and also the orientation of the banknote.

Figure 7:
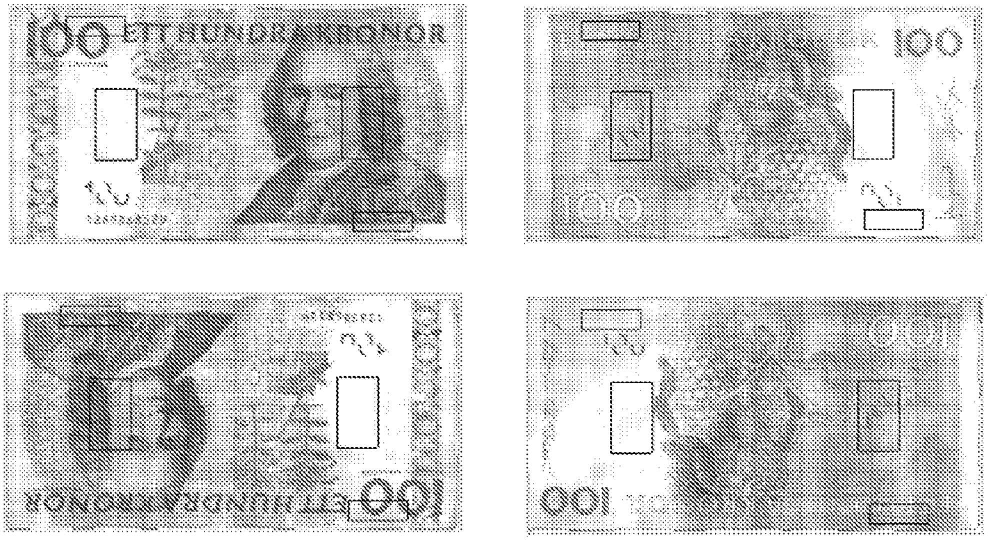
FIG. 7 shows four different images of one banknote, the front side, back side (upper row) and each side rotated 180 degrees (lower row).

FIG. 7 shows four different images of one banknote, the front side, back side (upper row) and each side rotated 180 degrees (lower row).

The banknote image document is classified as a recognized size and recognized face-image, or it may be considered as unclassified.

The face of the banknote is recognized by using small rectangle sample regions, or any other shape, e.g. circular, that together are unique for the face of the determined size. Each specific banknote is represented by four different images where each has its face sample regions. This is illustrated in FIG. 7 and the four different images is the front side, back side and each side rotated 180 degrees.

The regions are identified by the number of dark pixels in the region. Any combination of the layers (CMY) and any threshold-level may be adapted individually for each region.

Thus, the result is a numerical value of face-identification and information if face is upside down. Unclassified face results in that the banknote is classified as a dyed banknote. The information regarding the identified face of the detected banknote is necessary in the following steps as the corresponding face of the reference banknote image (RBI) is to be used.

C—Printed Pattern Positioning Step

The printed pattern on a banknote is located at individual predetermined positions for individual banknotes due to slight differences related to production tolerances. The pattern position must therefore be accurately determined for the banknote to be able to perform accurate comparisons to the reference banknote image.

It is therefore extremely important that the detected image is positioned in a known position before the comparison step is performed.

Figure 8:
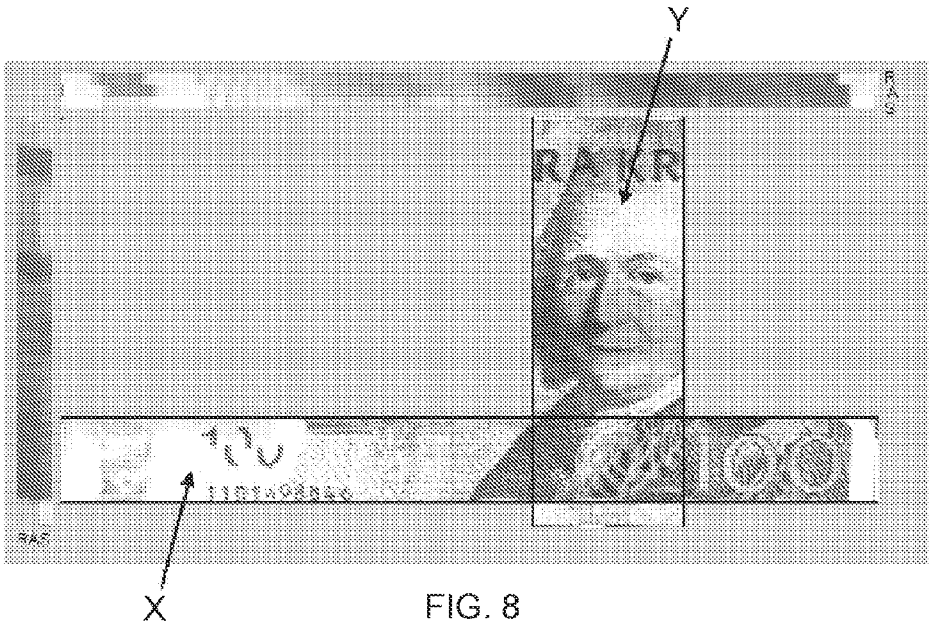
FIG. 8 illustrates the step of locating the pattern position.

FIG. 8 illustrates the step of locating the pattern position.

To perform this, two predefined limited regions are identified, one horizontal region X and one vertical region Y which are shown in FIG. 8.

With references to region X in FIG. 8 the limited region is scanned to create a line-pattern (strip or line S in the illustration). The line-pattern is created by calculating the mean value of all pixels in one vertical row in the region and then aligning all mean values. The result is a small data-area that represents the whole defined region. Only one predefined layer of CMY is selected individually for each face/scanning (but in the figure it is shown as monochrome grey).

The scanned line-pattern S is compared to a reference line-pattern R. By trying to match R and S in a number of different positions, by comparing the sums of all pixels difference abs(R-S) in the line, a best match adjusted position offset is the result. Objects that are not position-related to the pattern, such as metallic strips, are masked out and not included in the comparison. The adjusted position is illustrated as the line R and is moved to an adjusted position line A. The reference line-pattern R is typically created from mean-values from 800 scanned images that are pattern-matched.

Figure 9:
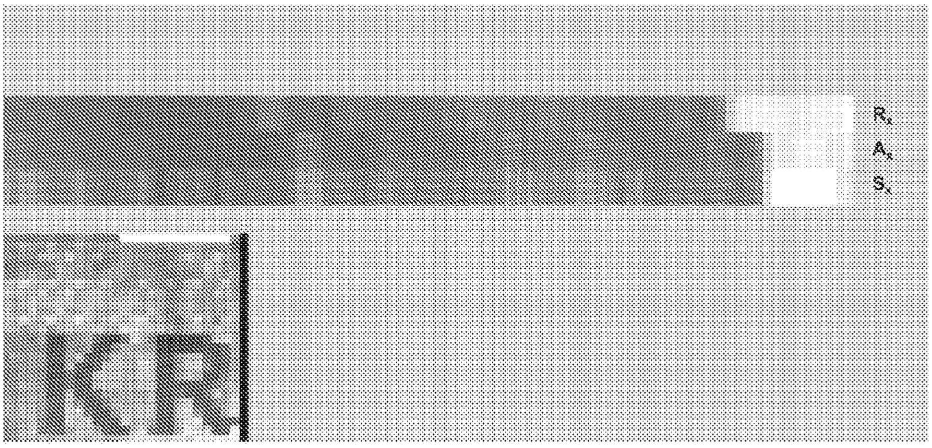
FIG. 9 shows a zoomed in detail of a matched pattern position during the matching step.

FIG. 9 illustrates a zoomed detail of the adjusted strips, i.e. of a matched pattern position during the matching step. Here the different strips are denoted $R_x$, $A_x$ and $S_x$.

Preferably the reference-line R is moved to an adjusted position line A, that achieves good matching to the scanned line-image S. However, the important feature is how much the scanned line-image S has to be moved in relation to the reference-line R in order to achieve a good matching, irrespectively if line R or line S is moved.

This process for horizontal pattern X-match is repeated for vertical pattern Y-match. The x and y offsets are saved for later reference during the pattern-comparison step.

It should be noted that by this positioning step the picture (pattern) on a banknote is correctly positioned in relation to the pattern of the reference image which is necessary in order to obtain very accurate results in the next step.

By instead using e.g. the corners of the banknote in order to correctly position the banknote would not result in that the banknote is enough accurately positioned to ascertain highest possible detection yield in the next step, e.g. the picture on banknotes is often not positioned in exactly the same place on the paper and that the size, and then the position of the corners, might deviate up to one or two millimetres between different banknotes.

Preprocessing of a Reference Banknote Image (RBI).

A reference image of each face of a banknote must be created in order to perform the comparison step with the banknote to be investigated.

This process to create reference images are made only once prior when the banknote detector device is set up for use. Thus, before an entire banknote can be scanned for robbery ink colour, a reference image for each face must be available to know where printed colour already exist as normal pattern of a banknote, and how normal existing dirt appear.

Figure 10:
FIG. 10 illustrates a reference image created by calculating the mean-value of the pixels of each pixel position from typically 200 street quality banknotes.

FIG. 10 illustrates a reference image created by calculating the mean-value of the pixels of each pixel position from typically 200 street quality banknotes.

According to a preferred embodiment typically 200 banknotes are scanned in a detector machine, e.g. a CIS-sensor. The number must be at least 100, and if possible as many as 400. To avoid repeatable inaccuracy such as individual detector-specific inaccuracy, images are sampled from two different detectors in the machine, and from different scanned faces-directions. The banknotes should be of street quality including normal existing dirt etc.

The scanned image is stored in an RBI storage as an RGB image. In order to facilitate the further processing of the image, the image is preferably "inversed" and stored as a CMY image (Cyan, Magenta, Yellow).

All 800 images for one banknote (front side, backside, and each side rotated 180 degrees) are then matched together by the pattern. To perform the pattern-match, the printed pattern positioning step (C) described above is used, but since the final reference line-pattern is based on this mean-image, a temporary reference line-pattern created from one single good quality note is used in the first iterate. After the pattern-matching, the reference image is created by calculating the mean-value of the pixels of each pixel position.

In an iterate method to increase reference image quality, this first created reference image is now used to create a new better reference line-pattern to be used in the step C. This process to create a reference image mean-value from the 800 images is then repeated, but instead of using the single good quality note, the improved mean-value reference line-pattern data is used.

The iterated reference image is cropped (outer line in FIG. 11) by estimating the end where a few individual notes paper no longer exist (i.e. where pattern and dirt start get lighter). The result should be a reference-size of a minimum paper-size rather than a mean-size.

The result is only for the reference line-pattern purpose, the entire mean-image is not used and may only be saved to re-create a modified reference line-pattern with a new defined region.

Figure 11:
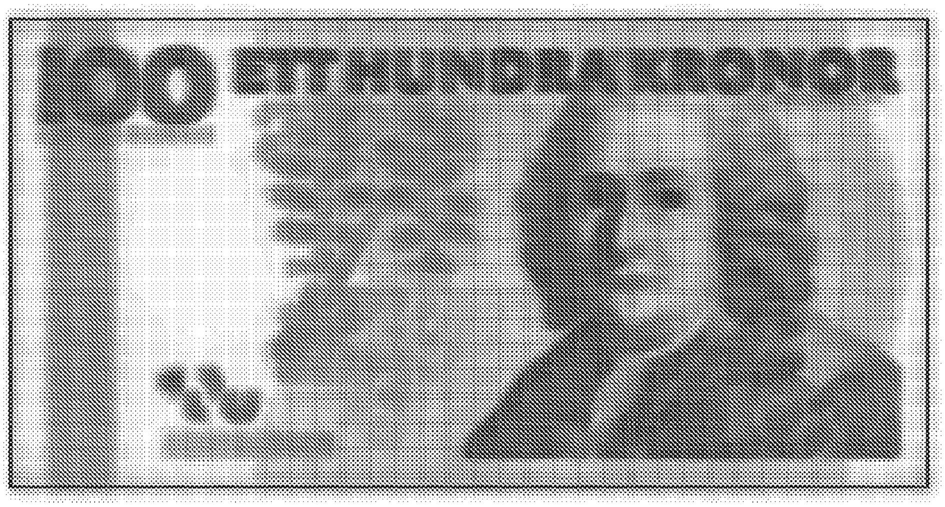
FIG. 11 shows a street quality processed reference banknote image.

FIG. 11 shows a street quality processed reference banknote image.

After the final reference line-pattern is ready, a reference banknote image is created for colour detection purpose.

The reference image for detection purposes should accept individual typical darker detected banknotes, due to individual banknote production pattern-darkness or individual dirt etc. In addition the reference image for detection purpose should accept smaller individual mismatch of located position for detected notes.

All 800 images are used again, and after matched by locating the pattern position, each CMY-layer pixels are separately calculated by mean value plus one standard-deviation for each of the 800 images. This will make the reference image darker.

Furthermore, starting by the resulting reference image each pixel are moved to the 8 closest adjacent positions to create total 9 identical images but with 9 different positions. The CMY-layers of the 9 images are separately merged by choosing the darkest pixel. This will make the reference image less sensible to mismatched detected banknotes.

The result that consist of a reference line-pattern and a processed reference images for each face are merged together with the detection-application in the target system. This processed reference banknote image is denoted RBI and is stored in the RBI storage and illustrated in FIG. 11.

D—Comparison Step

Now, going back to the processing of a banknote inserted into a banknote handling machine.

After that the location of the pattern position is determined according to step C, the banknote image is divided into different defined detection zones to be differently processed by the colour detection algorithms.

Figure 12:
FIG. 12 shows masked out and not detected region of a banknote.

FIG. 12 shows masked out and not detected region of a banknote. Predefined non-detectable zones are regions that may include objects that are not position-related to the pattern, such as metallic strips. They are masked out and not detected.

All the region that match inside the reference image is detected by reference-detection. Regions outside the reference image is detected by a non-reference-detection if the region is white which is marked by magenta (see arrows 3) in FIG. 12, while if the region outside the reference is a pattern-region then it is non-detectable and just masked out (see illustration where a magenta-zone is cut).

Each pixels in the image that are detectable is iterated for detection and is denoted a dyed-value. The dyed-value is higher on clearly ink-coloured spots while a more doubtable ink-coloured spot results in a lower dyed-value. If the sum-value of all pixels' dyed-values exceeds a predefined level this results in that the banknote is classified as a dyed banknote.

Figure 13:
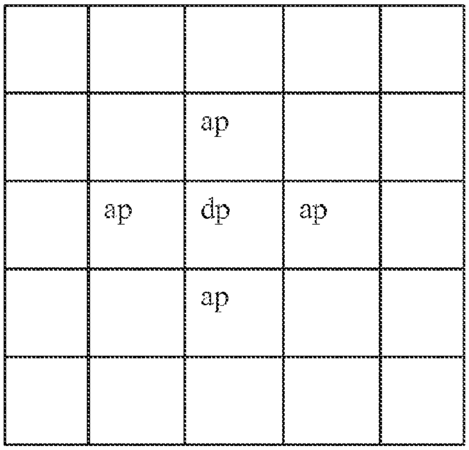
FIG. 13 illustrates an image pixel grid.

FIG. 13 illustrates an image pixel grid where dp denotes a detected pixel and ap denotes ambient pixels.

Since a large amount of individual single pixels with positive ink-detection due to e.g. optical interference exist, the detection is set up such that a single pixel never will result in a dyed-value. According to one embodiment only the detected pixel dp together with the 4 closest ambient pixels may be detected as a dyed spot. The detected pixel is detected by a detection colour-algorithm, while the ambient pixels condition must only match the detected pixel in CMY colour levels to create a dyed spot, i.e. to qualify the detected pixel. A smaller or larger number of ambient pixels may be used in this step as the chosen number depends inter alia upon the required accuracy and available processing capacity. For example 8 or 12 ambient pixels could be used in this regard.

Figure 14:
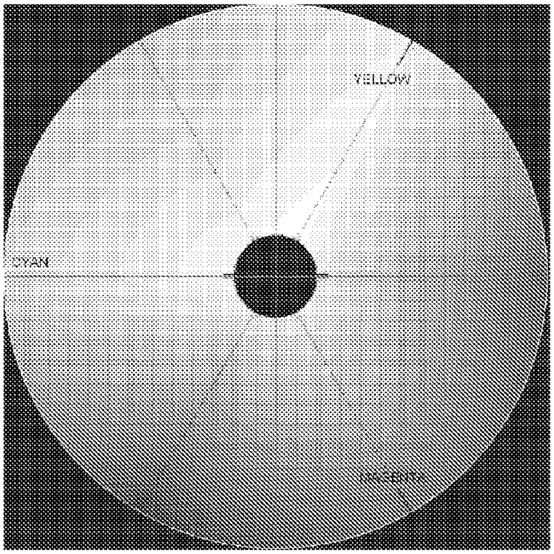
FIG. 14 is a non-grey colours diagram, although shown in a grey-scale where cyan, yellow and magenta are indicated.
Figure 15:
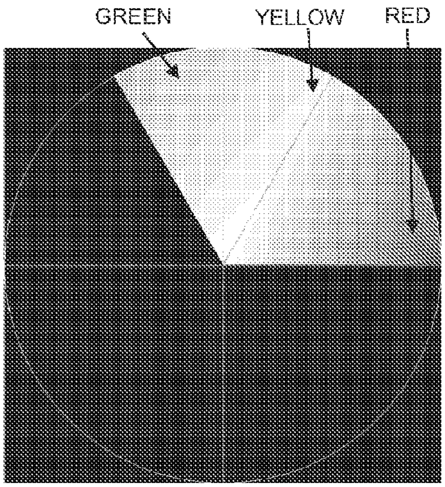
FIG. 15 is a dirt-colours diagram.
Figure 16:
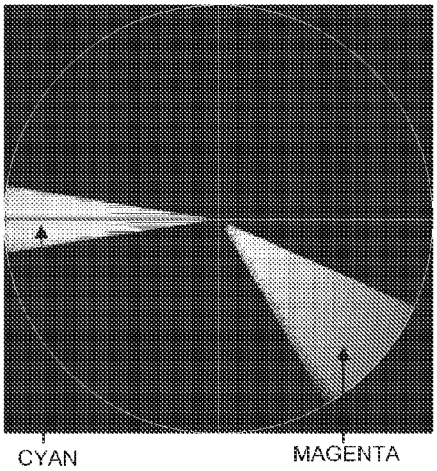
FIG. 16 is a high-gain colours diagram.

The colour-classification of the pixels will be discussed in the following. Each detect pixel colours are classified for detection purpose. In FIGS. 14-16 a number of colour CMY diagrams are shown—only shown in a grey-scale. Colour diagrams show only the pure colour composite, while the grey-scale, down to black, are not shown in the diagrams but is included in the classification.

FIG. 14 is a non-grey colour diagram, although shown in a grey-scale, where cyan, yellow and magenta are indicated.

The class "grey-colour" is the central part of the non-grey diagram, included all the grey-scale from white to black. The purpose for this is that detection should be less sensible to grey colours since the captured image creates a lot of grey-scale shadows and grey-scale sensible-defects.

FIG. 15 is a dirt-colours diagram.

The class "dirt-colour" is rare existing robbery ink colours, while this spectra is (except grey) the most common for dirt. This class is less sensible to colour detection.

FIG. 16 is a high-gain colours diagram Class "high-gain colour" is specific monochrome existing robbery ink colours that also typically is low-level colour. These specific colours, cyan and magenta, are therefore treated by using an extra sensible detection.

A colour detection algorithm will be described in the following.

For all iterated detection pixels, a CMY value must exceed a threshold level, where the threshold level is typically determined by the reference banknote image (RBI). Then the detection pixel must agree with the ambient pixels' colours, and then a dyed-value is determined for the detected pixel.

More in detail this is performed as described in the following:

Each detect-pixel position is iterated. For reference-detection CMY threshold levels are found by reading out the CMY-values from the reference image position, while for a non-reference-detection the threshold levels are fixed. The detect pixel CMY-value is read out.

If the detected pixel colour is a predefined "high-gain colour" and all CMY threshold-levels are less than 80 (i.e. only light regions), then the threshold levels are lowered by half for extra sensibility.

The detect-pixel CMY-values are compared to the CMY threshold-levels. If all CMY values are under the threshold-levels, the detect-pixel is considered as a not dyed spot, else the detect-pixel colour is classified, i.e. given a dyed-value. If grey or dirt-colour class, the threshold-levels will be increased and the comparison is repeated with the higher threshold levels and detect-pixel may be a not dyed spot, else the detection continues by comparing the detected pixel with the ambient pixels. If any of the ambient pixels have a level different than the detected pixel, the spot is considered as not dyed, else the detection continues by evaluating the dyed value.

The dyed value is counted by a progressive value due to how much the detected pixel CMY values exceed the threshold levels, only the highest exceeded value of CMY is the base to the dyed-value. At last if the detected pixel colour class is grey or dirt-colour, the dyed-value will be lowered or even may be disregarded as not dyed.

The result is summed for all iterated pixels into a total dyed-value for the entire banknote. The banknote is considered as dyed if the total dyed-value exceed a predefined level and a non-accepted signal is generated by the comparison unit, else an accepted signal is generated.

In summary, the comparison step comprises two different sub-steps, or subtests:

Threshold test—only applied if BI pixel is in the colour-scale "grey".

Spot test—to be regarded as a spot not only one pixel is required, but preferably the detected pixel and four ambient pixels should have essentially the same colour.

A requirement to perform the spot test is that the detected pixel and four ambient pixels, see FIG. 13, have essentially the same colour, then a difference value for the detected pixel with regard to the corresponding pixel in the RBI is determined.

Different parts of the colour diagram have different related points. The colour of the detected difference pixels must be determined. If a detected difference is an accepted detected difference depends also where in the colour diagram the colour for the identified detected difference pixel is positioned.

If the pixel is in the green/red part a higher point is given the dyed-value.

If the pixel is in the grey or brown parts a relatively lower point is given the dyed-value.

In addition, if a large difference between RBI and BI pixel values are determined additional higher "points" may be awarded that pixel's dyed-value, e.g. according to a progressive scale.

An overview of the comparison step is described as follows:

Step 1: If colours of dp and 4 ap:s are approximately the same then continue to next step, else go to next dp.

Step 2: Compare colours of BI dp and the corresponding RBI pixel and determine a difference value, DV, representing the difference between these colours.

Step 3: Determine the position in the colour diagram of BI dp and determine a colour value CV related to that position.

Step 4: Compare DV to CV and if DV exceeds CV, add DV to the dyed value calculation related to the banknote.

Step 5: If the total dyed value for the entire banknote exceeds a preset threshold value the banknote is classified as non-accepted, i.e. dyed.

As an example, the point awarding functions result in that few sharp red spots detected on the banknote result in an ink-dyed detection, and that many small red spots detected on the banknote also results in and gives an ink-dyed detection. This is due to the fact that the colour red is awarded high points in the colour diagram and that sharp colours, meaning higher detected difference, also is awarded a higher point.

A specific requirement for the banknote detector device is that all tests must be performed during a maximal time period of 100 ms.

The reason is that once the detection is performed, i.e. the banknote has passed the sensor, it continues along a feeding path to a junction where a non-accepted banknote is routed to a separate feeding path, and that the distance along the feeding path up to the junction must not be too long.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. Method in a banknote detector device for an automatic teller machine, to be used to differentiate non-accepted banknotes from accepted banknotes, the device comprises a banknote image sensor to receive and scan at least one face of an input banknote and to store a banknote image (BI) of each scanned face in a storage in dependence of said scanning, said banknote image comprises image data in the form of a number of pixels; and a reference banknote image (RBI) storage where one reference banknote image (RBI), being processed from a predetermined number of banknote images from accepted street-quality banknotes, is stored for each face of each relevant banknote, the banknote detector device further comprises an IR image sensor that is arranged to scan an input banknote and to store an IR-image of said banknote in said storage such that the IR-image being linked to the corresponding banknote image, wherein said method comprises:

A) an alignment step where one side of the banknote image is aligned in relation to the respective side of the RBI by use of said IR-image, and that the banknote size is determined, B) a banknote face classification step where the face and orientation of the banknote image are determined, C) a printed pattern positioning step where the printed pattern of the banknote image (BI) is determined in order to exactly position the BI printed pattern in relation to the printed pattern of a reference banknote image (RBI), D) a comparison step where, for at least one face of the banknote, the BI and RBI, being in exact pattern position in relation to each other, are compared pixel per pixel according to a predefined comparison procedure resulting in that the input banknote is classified as accepted or non-accepted, wherein in step C, two predefined limited regions of the BI are identified, one horizontal region X having a preset width and running along the longer side of the banknote and one vertical region Y having a preset width and running along the shorter side of the banknote, a line-pattern is created by calculating the mean values of all pixels in one vertical row in the horizontal region X and then aligning all mean values, resulting in a horizontal data-area line $S_x$ representing the whole region X, and the same procedure is performed for the vertical region Y resulting in a vertical data-area line $S_y$ representing the whole region Y, wherein $S_x$ and $S_y$ are compared to line-patterns of the RBI obtained in the same way and that said line-patterns are adjusted in relation to each other such that differences between corresponding pixel positions are minimized and the BI and RBI are then adjusted accordingly in relation to each other.

2. Method according to claim 1, wherein in step A, a squeezing method is used where the angle between the dark rectangle of the IR-image and a horizontal line is determined, and the banknote image is then iteratively rotated until the banknote image is in a horizontal position, where the longer side is horizontal.

3. Method according to claim 1, wherein in step D, predefined metal strips and serial numbers parts of the banknote are not taken into account.

4. Method according to claim 1, wherein in said reference banknote image (RBI) storage one reference banknote image (RBI) is stored for each face of each relevant banknote such that each specific banknote is represented by four different images, one image per banknote side and each side rotated 180 degrees.

5. Method according to claim 1, wherein said RBI is obtained by processing, according to an RBI processing algorithm, in an image processor, a predetermined number of banknote images from accepted street-quality banknotes, wherein each pixel in the reference banknote image are moved to the 8 closest adjacent positions to create in total 9 identical images but with 9 different positions.

6. Method according to claim 1, wherein in step D a detected pixel is denoted a dyed-value as a result of comparison to a corresponding RBI pixel provided that a preset number of, preferably four, ambient pixels have essentially the same colour.

7. Method according to claim 1, wherein in step D a difference value is determined for the detected pixel with regard to the corresponding pixel in the RBI and the difference value is compared to a colour value related to the position of the BI detected pixel in a colour diagram, and if said difference value exceeds the colour value a dyed value for the banknote is increased by the difference value.

8. Method according to claim 1, wherein in step D, some predefined parts of the banknote are not taken into account.

9. Banknote detector device for an automatic teller machine, to be used to differentiate non-accepted banknotes from accepted banknotes, the device comprises a banknote image sensor to receive and scan at least one face of an input banknote and to store a banknote image (BI) of each scanned face in a storage in dependence of said scanning, said banknote image comprises image data in the form of a number of pixels; a reference banknote image (RBI) storage where one reference banknote image (RBI), being processed from a predetermined number of banknote images from accepted street-quality banknotes, is stored for each face of each relevant banknote, and an IR image sensor arranged to scan an input banknote and to store an IR-image of said banknote in said storage such that the IR-image being linked to the corresponding banknote image, wherein said detector device comprises an alignment unit to align one side of the banknote image in relation to the respective side of the RBI by using said IR-image, and that the banknote size is determined, a banknote face classification unit to determine face and orientation of the banknote image, a printed pattern positioning unit where the printed pattern of the banknote image (BI) is determined in order to exactly position the BI printed pattern in relation to the printed pattern of a reference banknote image (RBI), a comparison unit where, for at least one face of the banknote, the BI and RBI, being in exact pattern position in relation to each other, are compared pixel per pixel according to a predefined comparison procedure resulting in that the input banknote is classified as accepted or non-accepted, wherein in said pattern positioning unit two predefined limited regions of the BI are identified, one horizontal region X having a preset width and running along the longer side of the banknote and one vertical region Y having a preset width and running along the shorter side of the banknote, a line-pattern is created by calculating the mean values of all pixels in one vertical row in the horizontal region X and then aligning all mean values, resulting in a horizontal data-area line $S_x$ representing the whole region X, and the same procedure is performed for the vertical region Y resulting in a vertical data-area line $S_y$ representing the whole region Y, wherein $S_x$ and $S_y$ are compared to respective line-patterns of the RBI obtained in the same way and that said line-patterns are adjusted in relation to each other such that differences between corresponding pixel positions are minimized and the BI and RBI are then adjusted accordingly in relation to each other.

10. Banknote detector device according to claim 9, wherein said alignment unit uses a squeezing method where the angle between the dark rectangle of the IR-image and a horizontal line is determined, and the banknote image is then iteratively rotated until the banknote image is in a horizontal position, where the longer side is horizontal.

11. Banknote detector device according to claim 9, wherein said banknote image sensor is a banknote RBG image sensor, and that the images are stored in CYM format.

12. Banknote detector device according to claim 9, wherein in said reference banknote image (RBI) storage one reference banknote image (RBI) is stored for each face of each relevant banknote such that each specific banknote is represented by four different images, one image per banknote face and each face rotated 180 degrees, said RBI is obtained by processing, according to an RBI processing algorithm, in an image processor.

* * * * *